Patented Feb. 25, 1941

2,233,358

UNITED STATES PATENT OFFICE 2,233,358

PIGMENTS AND PROCESS FOR PRODUCING THE SAME

Robert D. Nutting, Linthicum Heights, Md., assignor to E. I. du Pont de Nemours & Company, Wilmington, Del., a corporation of Delaware No Drawing. Application December 16, 1938, Serial No. 246,136

14 Claims. (Cl. 134—58)

This invention relates to the production of pigment-useful products and to processes for producing the same. More particularly, it relates to the production of an insoluble, stable pigment comprising a polyvalent metal salt of a polybasic, aliphatic, organic acid. In a specific sense, the invention concerns the production of a highly durable pigment product suitable for use in film-forming coating compositions, such as paints, pigmented varnishes, pigmented lacquers, etc., said pigment comprising a prime white pigment and, as an essential ingredient thereof, a trivalent or a tetravalent metal salt of a saturated, dibasic, aliphatic, organic acid.

It is well known that use of certain types of pigments in film-forming coating compositions employed for protecting or ornamenting surfaces exposed to the elements is seriously impaired because of the undesired lack of durability towards weathering which such pigments exhibit. Thus, after a relatively short period of exposure, the paint film exhibits an excessive checking, cracking, scaling, peeling, etc., and, as a consequence, the protection which application of the coating was designed to effect becomes lost. Titanium oxide is particularly notable in exhibiting a lack of desired durability characteristics, being prone to "chalk," or, if tinted, to "fade," when subjected to weathering. Fading or chalking occurs so rapidly that use of such pigment in exterior coating applications has been considered undesirable, both from the standpoint of early failure and the unsightly appearance presented by paint film surface by reason of such chalking or fading.

It is an object of the present invention to overcome these disadvantages which exist in prior pigments and to provide a pigment-useful compound which possesses desired durability and stability characteristics, and functions to impart such properties to the coating composition films in which the same may be incorporated. A particular object of the invention involves the production of a white pigment of exceedingly high durability characteristics comprising a metal salt of an aliphatic, organic, dibasic acid, said pigment also exhibiting increased hiding power values and other improved and desired pigmentary properties. A further and special object involves the production of an opaque, relatively insoluble, composite pigment comprising a prime white pigment and a metallic salt of a saturated, aliphatic, organic, dibasic acid. A still further object inclues the production of a coalesced pigment comprising a metallic salt of a saturated, aliphatic, organic, dibasic acid, which, when employed in whole or in part in the preparation of paints, pigmented varnishes, pigmented lacquers, etc., exhibits improved durability characteristics and inherent resistance towards chalking and color failure. Other and further objects of the invention will appear as the accompanying description proceeds.

These and other objects are afforded by the present invention which involves the production of a metallic salt of an aliphatic, organic, dibasic acid useful as a pigment by a metathetical reaction between a solution of a polyvalent metal salt and a solution of a salt of a suitable organic acid.

More specifically and preferably, the invention involves the production of an organic titanium or zirconium compound useful as a pigment, by interacting aqueous solutions of a soluble titanium or zirconium compound with a saturated organic, aliphatic, dibasic acid, and effecting said interaction in the presence of substantial quantities of a prime white pigment, whereby relatively small or minor amounts of said organic compound or mixtures of the same become intimately associated with said prime pigment.

In adapting the invention to practice, an aqueous solution, preferably of a soluble salt such as the chloride, sulfate or nitrate of a polyvalent metal from groups III and IV of the periodic table of elements, and particularly of titanium, zirconium, aluminum, tin, lead, cerium, and thorium, is caused to be reacted with a sodium, potassium or other soluble alkaline salt of an aliphatic, dibasic, organo acid of the general formula $C_nH_{2n}(COOH)_2$, containing, preferably, from 3 to 6 carbon atoms in each molecule and at least 1 carbon atom other than the two present in the carboxyl groups. Examples of preferred and employable compounds include malonic, succinic, glutaric, adipic, pimelic acids, those related thereto or isomeric therewith, as well as the soluble salts thereof. As a result of such interaction and upon filtering, washing and drying the precipitate obtained at a temperature below about 130° C. to avoid decomposition, insoluble, pigment-useful compounds, substantially non-reactive towards coating composition vehicles, are obtained.

While compounds thus obtained may be employed directly as pigment substances, I have found that optimum benefits and advantages accrue under this invention when such compounds are employed as treating or modifying agents for known and available types of pigments. Accordingly, in the preferred adaptation of the invention, relatively small and minor quantities of such pigment-useful compounds, and particularly the titanyl and zirconyl salts thereof, are caused to be formed in the presence of suspended particles of pigments and preferably in the presence of that variety which have been previously calcined, such as the prime white pigments of titanium oxide, zinc sulfide, etc., or the barium or calcium sulfate-extended forms of said pigments, whereby the polyvalent metal salt becomes precipitated upon and intimately associated or coalesced with the said prime pigment to substantially completely coat its surfaces. The amount of metallic salt thus employed is preferably not in excess of about 10%, based on the weight of the pigment under treatment, and may range to as low as about .5%, depending upon the extent of modification or type of properties desired to be imparted to said prime pigment.

While obviously one may exercise a certain degree of freedom in the selections of conditions under which the metallic organic compound, or mixtures of the same, are produced, it will be found preferable and desirable to mix the reactants in such proportions that no excess of either reactant is contained in the mother liquor. Thus, for example, in the preparation of titanium succinate, a titanium salt, such as titanyl chloride or sulfate, is carefully added to a sodium or other alkali succinate solution in the proper molar ratio. Also, it will be found highly desirable to maintain the acid mother liquor as nearly neutral as convenient, because under such conditions the resultant precipitate composition will be found to more completely approximate desired pigment quality and perfection. Under such conditions, none of the utilized metal salts will remain in solution for discard as waste material with the sodium salt liquor residue.

To insure a more complete understanding of the invention, the following illustrative examples are given, none of which are to be considered as in limitation thereof:

*Example I*

A sodium succinate solution is prepared by dissolving a molar part of succinic acid in water and then adding two molar parts of caustic soda thereto. A titanyl sulphate solution is prepared by dissolving titanyl sulphate crystals in water and the two solutions are then mixed by addition of the titanyl sulphate solution to the sodium succinate solution. A white titanium succinate is precipitated upon admixture, which is then filtered, washed and dried at approximately 100° C.

*Example II*

To 1,000 parts by weight of calcined titanium oxide pigment suspended in 6,000 parts by weight of water are added 89 parts by weight of titanium sulphate contained in 300 parts by weight of slightly acid solution. To this is then added a separately prepared solution of 66 parts by weight of succinic acid dissolved in sufficient water to which has been added 45 parts by weight of caustic soda. The titanium succinate is precipitated immediately onto the surfaces of the titanium oxide particles, approximately 100 grams being precipitated on the 1,000 parts by weight of titanium dioxide. After agitation, washing, filtering, drying and grinding, the material is then ready for use in film forming coating compositions.

*Example III*

300 parts by weight of tartaric acid are dissolved in water to which has been added 160 parts by weight of caustic soda in order to form a neutral sodium tartrate solution. To this solution is then added 160 parts by weight of titanyl sulphate in aqueous solution which is slightly acid. The bringing together of these two solutions produces a titanium tartrate precipitate in which there is about 14% titanium. This precipitate is then washed to free it of sodium sulphate and can then be used for blending with other pigment materials, after which it is dried or dried alone and used in compositions where pigments are useful.

*Example IV*

To 1,000 parts by weight of calcined titanium oxide suspended as a slurry in 6,000 parts by weight of water are added 46.5 grams parts by weight of titanium sulphate contained in 160 parts by weight of slightly acid solution. To this is then added a separately prepared solution of 92.5 parts of tartaric acid dissolved in sufficient water to which was added 49.5 parts of caustic soda. The titanium tartrate is precipitated onto the surfaces of the titanium oxide particles approximately 100 parts being precipitated onto the 1,000 parts of titanium oxide. After agitation, washing, filtering, drying and grinding, the pigment is then ready to be used in film forming coating compositions.

*Example V*

To 1,000 parts by weight of calcined titanium oxide suspended as a slurry in 6,000 parts by weight of water are added a solution of zirconyl sulfate ($ZrOSO_4$) containing 20 parts by weight of dissolved zirconium dioxide. A solution of sodium adipate ($C_4H_8(COONa)_2$) is next prepared and an amount equivalent to 14.6 parts of adipic acid is added to the pigment suspension. A precipitate of zirconyl adipate is immediately precipitated on the $TiO_2$ pigment particles. The suspension is then filtered and dried at about 110° C. This pigment was found to have improved non-yellowing properties in a synthetic resin coating composition as well as superior non-chalking properties. This pigment contained 2.5% of zirconyl adipate uniformly distributed throughout the $TiO_2$.

It will be found desirable, when employing titanium sulfate, such as in Example I, that the titanium solution added be slightly acidic and that it not be of highly acid character, since otherwise the yield in composition of the resulting product will be adversely affected. Preferably, the titanium sulfate should not contain an excess of sulfuric acid over that represented by the formula $TiOSO_4$, as otherwise, an acid solution would result and should the reaction be conducted at a temperature not greater than 25° C., all the titanium might not be precipitated and the product obtained would not correspond to the formula of titanium succinate and contain about 27% titanium.

If, on the other hand, the amount of caustic soda employed in the preparation of the sodium succinate solution in Example I is greater than that corresponding to the amount of sulfuric acid in the titanium sulfate solution, all of the succinic acid may not be precipitated and the resulting product will contain titanium hydroxide which is not desired. Therefore, care must be exercised in neutralizing the titanium sulfate solution, due to the tendency of such solution to hydrolize at low acid concentration and form objectionable titanium hydroxide.

As has been indicated, it will be found preferable and desirable to maintain the mother liquor acid as nearly neutral as convenient, whereby obtainment of a precipitate composition of desired properties and pigmentary values becomes assured and one is not obtained which has been adversely affected by reason of the use of a highly acidic solution. A desirable, convenient and preferred pH range for procuring optimum pigment compositions in my invention comprises a pH of 5 to 8.

While varying types of composite pigments have been described in the foregoing examples, obviously the invention is not limited thereto. As indicated, and in the preferred adaptation, the metallic salt of the organic, dibasic acid is caused to be intimately associated with a base or prime pigment, whereby the same will act as a modifying agent therefor to improve and enhance its pigment properties and impart requisite resistance to chalking and/or fading when said pigment is subsequently employed in coating compositions to be exteriorly applied. In such preferred adaptation, relatively minor amounts of the organo-metallic salt, or mixtures thereof, are employed, as for instance not in excess of about 10%, based on the weight of the pigment under treatment. In some instances, amounts as low as about .5 or 1% of the metallic salt may be employed in such treatment, but generally and preferably I employ quantities ranging from about 2% up to about 8%. Through the employment of these minor amounts, I effect a relatively complete coating of the pigment base and desirably fill its pores. Use of amounts in excess of 10% will be found undesirable, since such larger quantities fail to provide any additive improved results and adversely affect the texture characteristics of a coating composition film, due to objectionable grit formation in the pigment.

Although precipitation of the organic salts upon pigment particles constitutes a preferred embodiment of the invention (since by so operating one may obviously previously calcine and grind the prime pigment to desired fineness and thereafter precipitate the metallic salt upon the surfaces of the pigment), it will be obvious that a composite pigment may also be prepared by separately forming or precipitating the metallic salt of the organic, dibasic acid, following which blending with the previously prepared base pigment component may be had. This blending may take place at any time subsequent to formation or precipitation of the metallic salt, and the blended product may then be dried and otherwise suitably processed prior to use as a pigment.

As indicated, drying of the metallic salt of the organic acid is preferably effected with care, since otherwise decomposition of the materials will result, should an excessive drying temperature be resorted to. Temperatures of the order of not to exceed about 130° C. are preferably employed in effecting such drying, these being had, in most instances, by use of a steam heated dryer, so operated that at no time is the pigment maintained at a temperature greater than about 110° C. Where the metallic salt of the organic acid is subjected to drying in excess of the order indicated, and in the absence of a prime pigment, production of a somewhat horny appearing material, gritty and hard in nature, and one which will prove very difficult to disperse will be found to result.

The pigment-useful products of the present invention, as stated, comprise metallic salts of a metal having a valence of 3 or more, and particularly those of the third or fourth group of the periodic table. The acid radical of the salt is preferably dibasic in character and derived from a saturated organic compound. This combination produces a complex precipitate of gel-like character which, particularly when thoroughly distributed upon the surfaces of a prime white pigment, produces an exceedingly useful, high-grade pigment combination. The results thus attained and by reason of use of the dibasic, saturated organic acids referred to are quite unexpected and entirely novel, especially when it is considered that when monobasic acids or polybasic, aromatic acids are employed in substitution, satisfactory, pigment-useful compositions are not obtained, and it is accordingly highly probable that this difference of effect or result is due entirely to the character of the precipitate obtained in each instance.

As heretofore stated, useful organic acids comprise the saturated, aliphatic, dibasic acids of the formula $C_nH_{2n}(COOH)_2$, containing at least 3 carbon atoms in each molecule and may, if desired, contain as high as 12 carbon atoms therein. Preferred acids comprise those containing from 3 to 6 carbon atoms in each molecule. Obviously, the hydrogen atoms attached to the carbon atoms may be partially or completely substituted by other substituents, such as alkyl, halogen or hydroxyl groups, without interfering with or impairing the pigment quality of the composition produced. In a generic sense, these substituted or derivative acids may be defined as having the structure

$$C_nH_{2n-x}R_x(COOH)_2$$

wherein R is an alkyl, OH or halogen, such as bromine, chlorine or iodine, $n$ is a whole number, and $x$ is either zero or a whole number not greater than $2n$.

While both titanyl and titanic salts of saturated, dibasic acids as improved composite pigments are indicated as obtainable in the invention, it will be found that the titanyl and zirconyl salts of said organic acids provide higher quality pigment compositions than those containing the same percentage of the titanic or zirconic salts of the same acid. Therefore, in the production of optimum pigments, in accordance with the invention, it will be found that this can be effected by resort to titanyl and zirconyl salt production.

While specific types of prime pigments have been utilized in the foregoing examples on which to precipitate the metallic organic salts of the instant invention, it will be obvious that other types of well-known pigments may be substituted therefor. Accordingly, in addition to the use of titanium oxide as a prime or base pigment material in the production of composite pigments in accordance with the invention, other types of pigments, alone or extended, or mixtures of the same, may be employed to produce a composite pigment comprising a metallic salt of an aliphatic, organic, dibasic acid, and such prime or base pigments. Specific examples of such additionally employable pigments include zinc sulfide, lithopone, zinc oxide, titanated lithopones, titanates, basic sulfate of white lead, basic carbonate of white lead, or colored pigments. When such prime pigments are treated in accordance with the invention, they will be found to be likewise exceedingly durable and resistant towards weathering, particularly chalking and fading, and to impart these same desirable characteristics to the paint or coating composition formulation in which they may be incorporated.

In exemplification of the advantages and improvements which the present invention affords, particularly in the instance of composite titanium oxide pigments, it will be found that when ordinary untreated titanium oxide pigment is ground in a drying oil modified polyhydric alcohol-polybasic acid resin together with suitable solvents, driers and other materials at a pigment-binder ratio of 73 parts of pigment to 100 parts of binder by weight and exposed to the elements on Florida fences at 45° south, it exhibits extreme chalking and fading within a very short period of time, and especially when present in tinted paints. For example, within two weeks' time the surface of the paint film becomes visibly affected while at the end of one month, chalking and fading are pronouncedly evident. When composite titanium oxide pigments of my invention are substituted for such prior, ordinary titanium oxide pigments in such formulations, and then exposed for comparable weathering tests in Florida, they exhibit distinct, superior durability properties. Thus, after exposure for a period of one month, the surface of the paint film remains unaffected and only after a lapse of time in excess of one and one-half months of continuous exposure is there any visible evidence of fading or chalking, and then only to a very slight extent. Even after test, under the most severe and adverse weather conditions, a film surface in which my novel pigment is present will exhibit a definite and considerable increase in life and durability properties.

I am aware that treatment of pigments with salts of dibasic aromatic or unsaturated aliphatic acids has already been proposed. Such types of agents, however, are unsatisfactory for affording the benefits and advantages of my invention. Thus, when titanium oxide pigments prepared in accordance with my invention are comparably tested with prior titanium oxide pigments, but coated with small amounts of a phthalate, the coating film in which my pigments are presented, and especially when polyhydric alcohol-polybasic acid resin types of compositions are comparably tested, they exhibit marked superior durability characteristics, particularly in respect to chalking and fading resistance properties. Furthermore, due to the unsaturated character of such prior treating agents, they tend to form solid resinous materials which are extremely objectionable due to the non-homogeneity of the coating composition either before or during its application to a given surface. Furthermore, such prior types of agents tend to react with certain constituents, such as glycerin, present in common coating composition vehicles, causing objectionable changes both in physical and chemical make-up of the vehicle and composition. In my invention, none of these disadvantages will be found to exist. Again, when a pigment such as titanium oxide is surface-coated with an agent of the type contemplated herein, the agent becomes intimately combined or associated with the pigment. Titanium oxide has a distinct tendency to catalyze certain reactions in the presence of light, and because of this characteristic, phthalate salts or unsaturated compounds such as maleates tend to react under such conditions, and as indicated, with coating composition vehicles. By utilizing the compounds of my invention and in the amounts specified, these objectionable disadvantages are completely overcome.

As has been indicated, titanyl and zirconyl salts constitute the preferred agents of my invention. They contain larger percentages of titanium oxide and zirconium oxide than normal titanic and zirconium salts and consequently afford greater pigmentation and hiding power values. Furthermore, their use involves greater freedom from grit formation in the resultant treated pigment, since avoidance of substantial amounts of uncombined organic acids and metallic hydroxides in the pigment, due to the hydrolysis of the normal salt to its components and the basic salt, is thereby had.

I claim as my invention:—

1. A process for producing stable, weather-resistant pigments, comprising intimately associating from about .5 to 10% of a substantially insoluble polyvalent metal salt of a metal from groups III and IV of the periodic table with a dibasic, saturated, aliphatic, organic acid containing at least three carbon atoms in its molecule with a base or prime pigment, while the latter is in aqueous suspension, recovering the resultant composite pigment and drying the same at a temperature below substantially 130° C.

2. A process for producing stable, weather-resistant pigments, comprising reacting in the presence of a base or prime pigment a solution of a soluble salt of a polyvalent metal from groups III and IV of the periodic table of elements with a dibasic, saturated, aliphatic, organic acid containing at least three carbon atoms in its molecule, whereby from about 2% to 8% of the metallic salt reaction product becomes precipitated on said base or prime pigment, recovering and washing the resultant composite pigment, and then drying the same at a temperature below 130° C.

3. A process for producing stable, weather-resistant pigments comprising reacting in the presence of a base or prime pigment a solution of a soluble salt of a polyvalent metal from groups III and IV of the periodic table of elements with a dibasic, saturated, aliphatic, organic acid containing at least three carbon atoms in its molecule, whereby from .5 to not in excess of 10% of the metallic salt reaction product becomes precipitated on said base or prime pigment, and then recovering and drying the resultant composite pigment at a temperature not in excess of 130° C.

4. A process for producing stable, weather-resistant pigments, comprising reacting in the presence of a base or prime pigment a solution of a soluble salt of titanium, with a dibasic, saturated, aliphatic, organic acid containing at least three carbon atoms in its molecule, whereby from .5 to not in excess of about 10% of the resulting, substantially insoluble titanium reaction product becomes precipitated on said base or prime pigment, and then recovering and drying the resultant product at a temperature not in excess of 130° C.

5. A process for producing stable, weather-resistant pigments, comprising intimately associating with a base or prime pigment, while the latter is in aqueous suspension from about .5 to not in excess of 10% of a substantially insoluble titanyl salt of a dibasic, saturated, aliphatic, organic acid containing at least three carbon atoms in its molecule, and subsequently drying the resultant composite pigment at a temperature not in excess of substantially 130° C.

6. A process for producing stable, weather-resistant pigments, comprising intimately associating with a base or prime pigment, while the latter is in aqueous suspension, from about .5 to not in excess of 10% of a substantially insoluble zirconyl salt of a dibasic, saturated, aliphatic, organic acid containing at least three carbon atoms in its molecule, and subsequently drying the resultant composite pigment at a temperature not in excess of substantially 130° C.

7. A pigment composition comprising a base pigment material having intimately associated therewith from about .5 to 10% of a substantially insoluble polyvalent metal salt of a metal from the groups III and IV of the periodic table with a dibasic, saturated, aliphatic, organic acid containing at least three carbon atoms in its molecule.

8. A pigment composition comprising a prime pigment having intimately associated therewith from about 2% to 8% of a substantially insoluble polyvalent metal salt of a metal from groups III and IV of the periodic table with a saturated, dibasic, aliphatic, organic acid containing at least three carbon atoms in its molecule.

9. A pigment composition comprising titanium oxide intimately associated with from .5 to 10% of a substantially insoluble polyvalent metal salt of a metal from groups III and IV of the periodic table with a saturated, dibasic, aliphatic, organic acid containing at least three carbon atoms in its molecule.

10. A pigment composition comprising titanium oxide on the surfaces of which is precipitated from 2% to 8% of a substantially insoluble titanyl salt of a saturated, dibasic, aliphatic, organic acid containing at least three carbon atoms in its molecule.

11. A pigment composition comprising titanium oxide on the surfaces of which is precipitated from 2% to 8% of a substantially insoluble zirconyl salt of a saturated, dibasic, aliphatic, organic acid containing at least three carbon atoms in its molecule.

12. A pigment composition comprising titanium oxide surface coated with from about .5 to 10% of precipitated titanium succinate.

13. A pigment composition comprising titanium oxide surface coated with from about .5 to 10% of precipitated titanium tartrate.

14. A pigment composition comprising titanium oxide surface coated with from about .5 to 10% of precipitated zirconyl adipate.

ROBERT D. NUTTING.